United States Patent [19]

Kato et al.

[11] 4,004,213

[45] Jan. 18, 1977

[54] SPARK GAP DETECTOR

[75] Inventors: Takayuki Kato, Nishikamo; Satoshi Yamazaki, Nagoya, both of Japan

[73] Assignees: Toyota Jidosha Hanbai Kabushiki Kaisha, Nagoya; Kabushiki Kaisha Toyota Chuo Kenkyusho, Aichi, both of Japan

[22] Filed: Oct. 31, 1974

[21] Appl. No.: 519,778

[30] Foreign Application Priority Data

Nov. 6, 1973 Japan ............................ 48-124641

[52] U.S. Cl. .................................... 324/15; 73/116

[51] Int. Cl.² ........................................ G01M 15/00

[58] Field of Search ................. 324/15, 16 R, 16 T; 73/116

[56] References Cited

UNITED STATES PATENTS 3,551,800 12/1970 Widmer ................................ 324/15

*Primary Examiner*—R. V. Rolinec
*Assistant Examiner*—Ernest F. Karlsen
*Attorney, Agent, or Firm*—Karl W. Flocks

[57] ABSTRACT

An apparatus for measuring the spark gap between the electrodes of the spark plug for automobile internal-combustion engines, comprising a probe adapted to detect a secondary voltage and having a potential divider circuit therein for supplying a low-voltage signal, and a plurality of electrical circuits for processing the signal and indicating the spark gap as detected for each cylinder on display means.

13 Claims, 22 Drawing Figures

SPARK GAP DETECTOR

BACKGROUND OF THE INVENTION

The present invention relates to a detector for the gap of the spark plug in use for automobile internal-combustion engine, and more particularly to an apparatus of the type which can measure the spark gap by electrical and electronical means without any need of removing the spark plug from the engine.

It is well known that the spark plug provides sparks to ignite and burn the air-fuel mixture compressed in the cylinder of the engine. In order to ensure the sparking action of the spark plug or obtain the sparks at a proper timing, it is necessary to previously adjust the spark gap of the spark plug to a desired spacing.

It is also known that if the spark gap is improperly provided, that is to say, in too narrow or wide a spacing, it may lead to failure to fire in the cylinder or improper spark timing. In order to avoid such inconveniences, therefore, it has been the practice that the spacing of the gap is very often measured and adjusted as necessary during the assembly line or periodical inspection and maintenance of the engine.

There is a conventional method of measuring the spark gap of the spark plug in which the plug is usually removed from the engine so that the gap may be directly measured by means of a thickness or clearance gauge. This may provide a high-precision measuring means, but is particularly disadvantageous since it always necessitates removal of the spark plug from the engine for inspection, thus delaying the assembly work of the engine and adversely affecting the periodical inspection of the vehicle.

There is known another conventional and improved method in which a high-potential d.c. voltage or pulse voltage is supplied across the spark plug, and its spark firing voltage is measured so as to know the spark gap which is usually obtained from the Paschen's law. This allows the spark gap to be measured with the spark plug installed in the engine, thus facilitating the measuring work for that matter. It is nevertheless disadvantageous since the spark firing voltages may have significant deviations due to the possibly contaminated or oxidized electrodes of the spark plug, which may also adversely affect the high-precision measurement of the gap.

The present invention has solved these disadvantages by providing a means of measuring the spark gap with a higher precision without any need of removing the spark plug from the engine. The invention is essentially based on the observation that the portion of induced discharge voltage in the secondary voltage of the ignition system has a duration of time corresponding to the length of the spark gap.

SUMMARY OF THE INVENTION

The present invention provides means of measuring the spark gap with a high precision, whereby the secondary voltages which are electrically detected from the ignition system and converted into signals are processed by a number of electrical circuits so that the spark gap as detected can be obtained by indicating means. According to the invention, it becomes much easier to measure the spark gap, thus improving the assembly and inspection works of engines.

It is therefore one object of the present invention to provide an apparatus whereby a gap of the spark plug as installed in the engine is electrically detected and converted into a signal which is electrically to be processed so that the gap as detected may be indicated.

Another object of the present invention is to provide an apparatus of the type whereby gaps of a number of spark plugs in a multicylinder engine can be separately detected and converted into individual signals which are electrically processed and separated so that the gaps as detected may be indicated individually.

DESCRIPTION OF THE PREFERRED EMBODIMENTS

Figure 1:
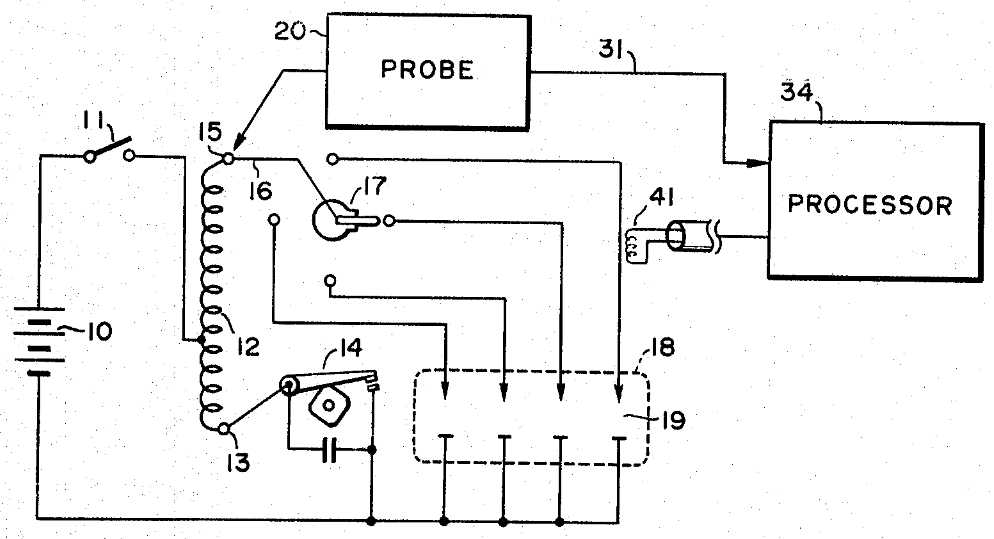
FIG. 1 is a schematic diagram of a preferred embodiment of an apparatus according to the present invention.
Figure 2:
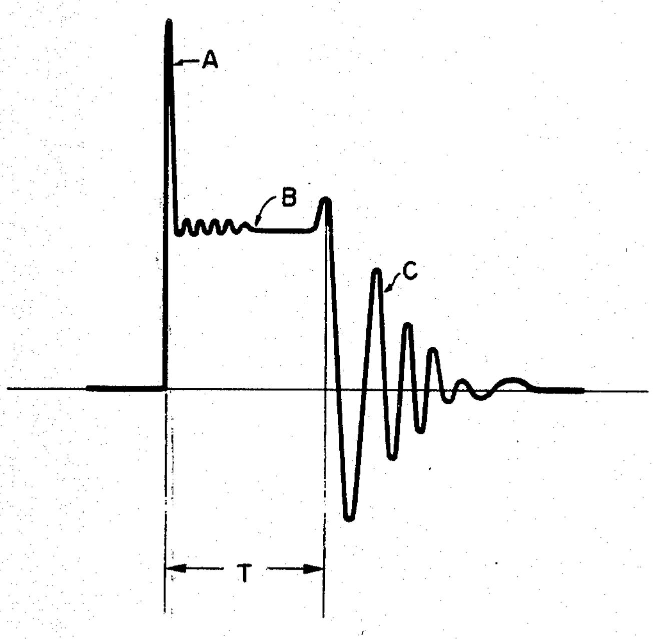
FIG. 2 shows a waveform of the secondary voltage from the ignition system of the engine.

The present invention will further be described by way of several preferred embodiments by reference to the accompanying drawings, in which:

Referring first to FIG. 1, the ignition system of the engine is generally described. A power supply voltage from a battery 10 is applied across an ignition coil 12 via a key switch 11. The ignition coil 12 has a primary terminal 13 connected to a contact breaker 14 to form a primary circuit for the ignition system. A secondary terminal 15 of the ignition coil 12 is connected to a distributor 17 which is connected to each of a number of spark plugs 19 in a combination chamber 18, and a high-potential secondary voltage is supplied to the spark plugs 19. The waveform of the secondary voltage is shown in FIG. 2, and essentially consists of three parts, i.e., part A of capacity discharge voltage, part B of induced discharge voltage and part C of free-oscillating discharge voltage (hereinafter referred to as part A, part B and part C, respectively). The part A is a spark firing or breakdown voltage which occurs the instant that the secondary voltage is supplied across the electrodes of the spark plug. The part B is a spark firing voltage that continues for a given period of time after the breakdown of the spark plug. The part C has its oscillating property depending on the circuit constants such as inductance, capacitance and resistance.

The part B shown in FIG. 2 has the duration of the spark that it provides, said duration depending on various factors. The most important factor that may determine the duration of the spark can be represented by the gap between the electrodes of the spark plug. This fact has been discovered and supported by the experiment.

Figure 3:
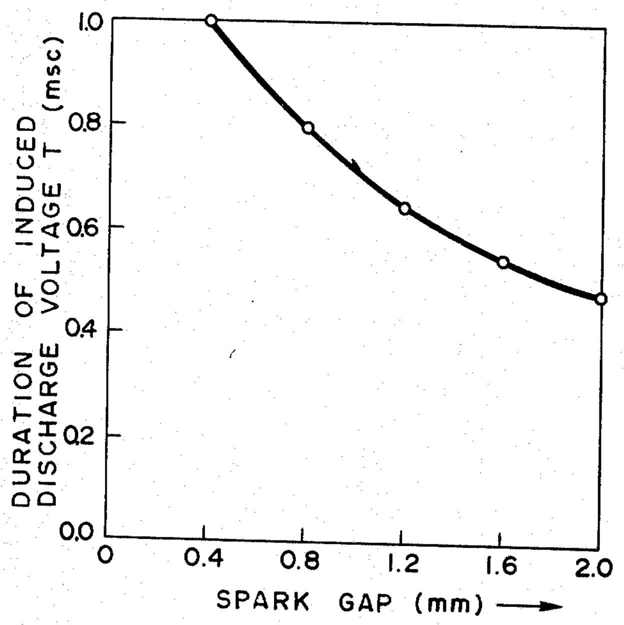
FIG. 3 is a graphical diagram characterizing the principle of the present invention.

FIG. 3 shows the relations between the gap of the spark plug and the duration of the spark that the part B provides. It is seen from FIG. 3 that these two, the gap and the duration, are in corresponding relations with each other, provided that the compression pressure within the combustion chamber is maintained within the normal range. The experiment has also shown that the gap can be measured precisely enough that it is within the range of 0.1 to 0.2 mm with respect to the duration of the spark. These relations can be accounted for from the fact that when the secondary voltage is applied to jump the gap between the electrodes of the spark plug, it breaks down the gap, thus ionizing the air or gas in the gap for producing sparks, but the duration of the jumped sparks is inversely proportional to the lengths of the sparks.

Figure 4:
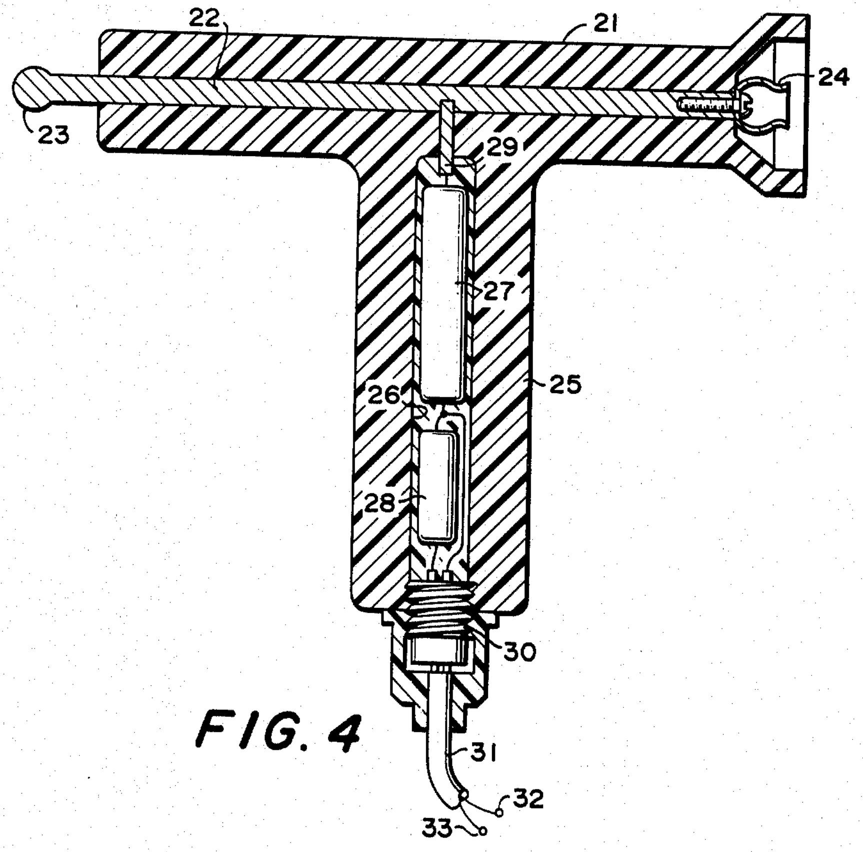
FIG. 4 is a sectional view of a preferred embodiment of a probe to be used for the present invention.

A waveform of the secondary voltage is shown in FIG. 2, which can be detected by means of a probe 20 shown in FIG. 1. The secondary voltage includes the part A of capacity discharge voltage in the range of several thousands to several ten thousands of volts, and the part B of induced discharge voltage in the range of several hundred to several thousand volts. As it is difficult or impossible to process these high voltages, there is provided a potential or voltage divider circuit for the probe 20 so as to obtain a low-voltage signal. FIG. 4 shows the detailed construction of a preferred embodiment of the probe 20 which is used for the apparatus of the present invention.

The probe 20 includes a body 21 of electrically insulating material such as bakelite or teflon, and an electrically conductive member 22 fixedly supported therein. The member 22 has a terminal 23 at one end thereof which is adapted for insertion to contact the secondary terminal of the ignition coil for maintaining an electrical contact with each other. The other end of the member 22 is internally threaded for receiving a screw terminal 24 which holds a wire from the ignition coil to maintain an electrical contact with the wire. A holder portion 25 provided integrally of the body 21 has a hollow portion 26 therein for accommodating voltage-divider resistances 27 and 28 therein.

The secondary voltage from the conductive member 22 leads through a lead terminal 29 to the resistances 27 and 28, and is divided at a point where the resistances 27 and 28 are connected. An individual signal which is obtained by dividing the secondary voltage flows through a connector 30 and a cable 31 to signal transmission lines 32 and 33. The signal flows further to an operational circuit 34 where it is electrically or electronically processed.

Figure 5:
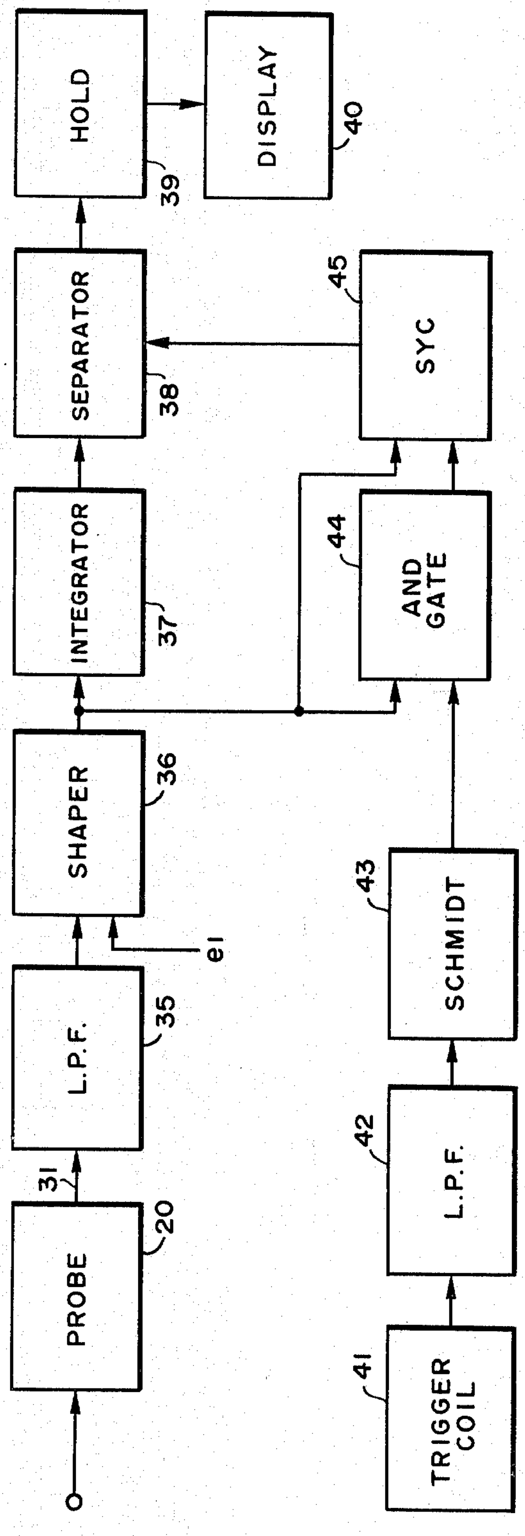
FIG. 5 is a block diagram of a preferred embodiment of an apparatus according to the present invention.

Referring next to the block diagram in FIG. 5, the operational circuit 34 will be illustrated below by way of preferred embodiment thereof.

Figure 6:
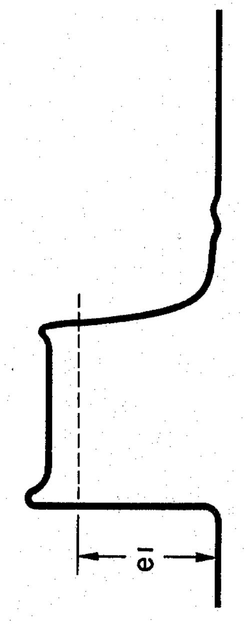
FIG. 6 shows a waveform of that portion of induced discharge voltage which is obtained by filtering the waveform of FIG. 2.
Figure 7:
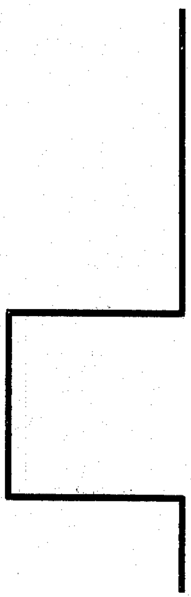
FIG. 7 shows a pulse of a rectangular waveform which is obtained by shaping the waveform of FIG. 6.

A detect signal as is individually converted by the probe 20 into a low-voltage signal is applied through the cable 31 to a low-pass filter which passes only a signal of the part B as shown in FIG. 6 while rejecting the passage of the undesired signals of the parts A and C. The signal thus filtered goes further to a waveform shaper circuit 36 which is represented by Schmidt circuit. It is then shaped into a pulse of a rectangular waveform as shown in FIG. 7 by the Schmidt circuit which has been level-adjusted by Schmidt level voltage el. It is clearly to be understood from FIG. 7 that the pulse of rectangular waveform has a width or duration of time corresponding to the length of the spark time of the part B. The pulse flows further to an integrator circuit 37 where it is converted into a d.c. voltage pulse which is then separated by a separator circuit 38 into an individual signal to represent a gap as detected for a particular or each cylinder. The individual signals thus separated flow to a hold circuit 39 where they are held or stored, and are indicated one after another by an indicator circuit 40 which individually indicates the gap as detected for each cylinder.

The separator circuit 38 above mentioned will now be described in more details.

A synchronizing signal which is used for controlling the separator circuit 38 is obtained by shaping a trigger signal detected by a trigger coil or induction coil 41 as shown in FIG. 1. The synchronizing signal is detected by non-contact induction of the trigger coil 41 from the secondary voltage signal, and essentially corresponds to any particular cylinder. The signal is filtered by a low-pass filter 42 into a low-frequency signal which flows to a Schmidt circuit 43 where it is shaped into a signal of a rectangular waveform. The synchronizing signal is applied to AND-element circuit 44 together with the secondary voltage signal shaped by the shaper circuit 36. The AND-element circuit 44 is then enabled to send out only any one of the two signals that corresponds to any particular cylinder. The output of the AND-element circuit 44 is applied to a synchronizing circuit together with the secondary voltage signal, the output of said synchronizing circuit being supplied to the separator circuit 38.

Figure 8:
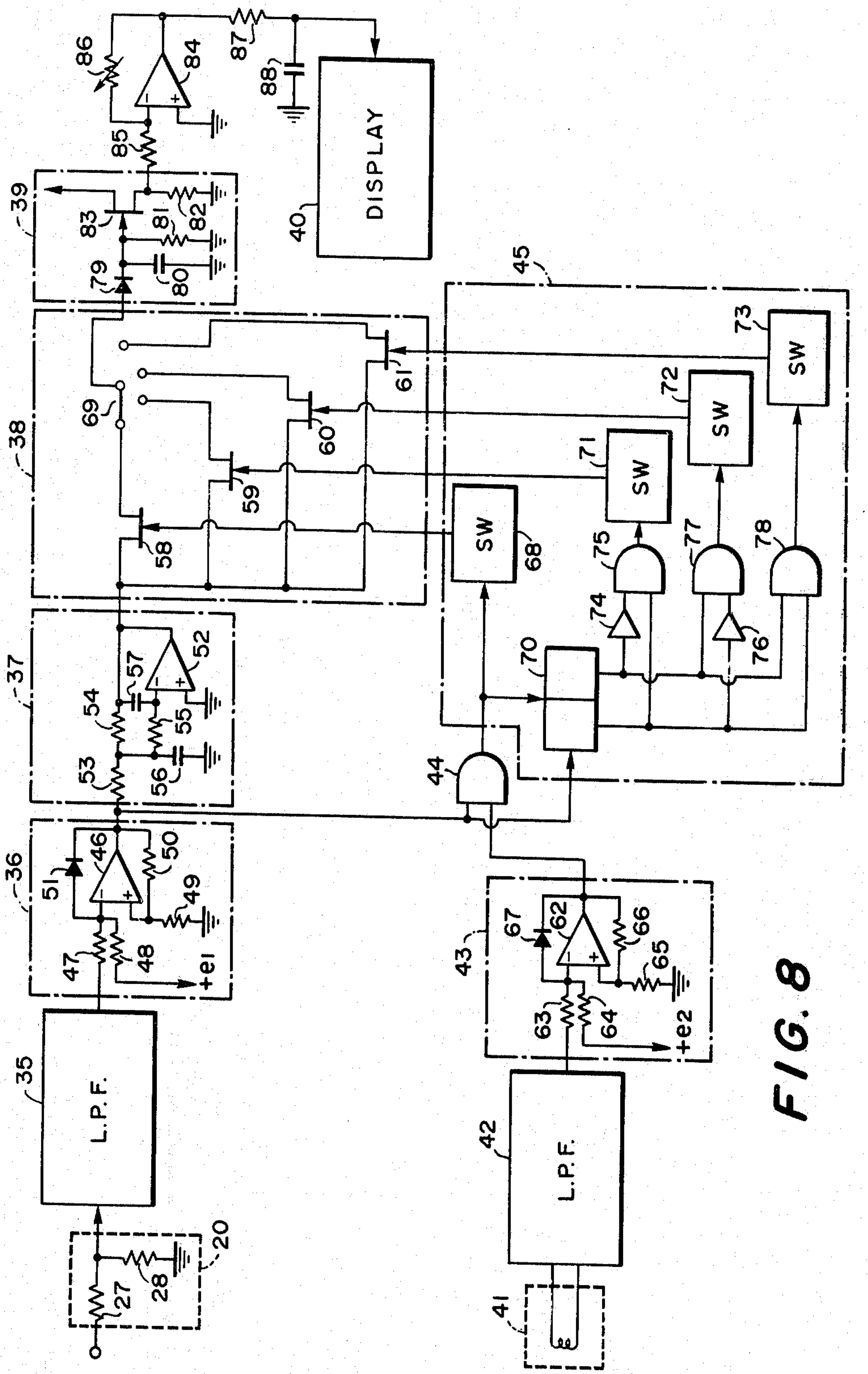
FIG. 8 is a schematic diagram showing the arrangement of circuit elements.

There is shown a further detailed diagram of circuit elements in FIG. 8. Referring then to FIG. 8, the preferred embodiment of FIG. 5 is further described below.

The detected secondary voltage is divided by the two resistances 27 and 28 of the probe 20 into a low-voltage signal which goes further to the Butterworth-type low-pass filter 35, for example, which passes only the part B while rejecting the other parts A and C. The output of the low-pass filter 35 is applied to a zero-cross Schmidt circuit which consists of a differential-type operational amplifier 46, resistances 47, 48, 49 and 50, and a diode 51. As the Schmidt circuit has a Schmidt level voltage *+el* applied through the resistance 48, it will not supply an output signal if an input voltage is below that level voltage *+el*. When the secondary voltage above the level voltage *+el*. is applied, then the circuit delivers an output signal 1. The output signal 1 is further supplied to the shaper circuit where it is level-adjusted and converted into a pulse of a rectangular waveform which has a width corresponding to the duration of the spark of the part B.

The output signal 1 is further applied to the integrator circuit 37 which consists of an amplifier 52, resistances 53, 54 and 55, and capacitors or condensers 56 and 57 where it is converted into a d.c. voltage signal which has a value proportional to the width of the input pulse. The d.c. voltage signal is then detected as a series of individual signals from each cylinder, said signals being applied to the source terminals of FET's 58, 59, 60 and 61 provided in the separator circuit 38.

In the meantime, the trigger signal to be detected by the trigger coil 41 and which includes high-frequency and low-frequency signals goes to the low-pass filter 42 which passes only the low-frequency signal as a low-frequency trigger signal while rejecting the passage of the high-frequency signal.

The trigger signal is then applied to a zero-cross Schmidt circuit consisting of an amplifier 62, resistances 63, 64, 65 and 66, and a diode 67 where it is converted into a pulse of a rectangular waveform which goes further to AND-element circuit 44. The AND-element circuit 44 also has the secondary voltage signal applied from the shaper circuit 36 but is controlled by the output signal of the Schmidt circuit 43.

An example of the four-cylinder engine is given for the convenience of easy understanding, where if the trigger coil 41 is such that it detects a synchronizing signal from a first cylinder, it is then energized to deliver only an output signal which corresponds to said first cylinder, flowing through a switching circuit 68 to the gate element of FET 58 which is then enabled to switch on the FET 58. As a result, the voltage signal supplied across the source terminal of the FET 58 is connected to a contact 1 of a selector switch 69.

The output of the AND-element circuit 44 is further applied to a register 70 as a reset signal which resets or clears old data in the register 70. A series of detect signals which correspond to their respective second, third and fourth cylinders are supplied one after another from the shaper circuit to the register 70 where the old data is reset or cleared by registering a new incoming data. Each time a new incoming data is stored in the register 70, the switching circuits 71, 72 and 73 are actuated to switch on the FET's 59, 60 and 61 in the separator circuit 38 in this order. For example, if the register 70 stores data 1, 0 to represent the signal from the second cylinder, only the switching circuit 71 is then actuated through the inverter gate 74 and AND-gate 75 to switch on the FET 59. Similarly, if the register 70 stores data 0, 1, the switching circuit 72 is actuated through the inverter gate 76 and AND-gate 77, and if the register 70 stores data 1, 1, the switching circuit 73 is actuated through AND-gate 78.

As can be clearly understood from the foregoing description, the synchronizing circuit 45 and separator circuit 38 are then actuated to separate the detect signals into an individual signal to represent the gap of its corresponding spark plug, and deliver is to the terminal of the selector switch 69. The selector switch 69 is then actuated to select any one or ones of the detect signals for a particular cylinder or cylinders whose spark gap or gaps are to be measured, which is or are then applied to a hold circuit 39 that consists of a diode 79, capacitor 80, resistances 81 and 82 and FET 83. The signal or signals are held by the hold circuit 39, and are then applied to an amplifier circuit which consists of an amplifier 84, resistance 85 and variable resistance 86 where they are amplified. The variable resistance 86 is used to adjust the compression pressure to be set in the combustion chamber, said compression pressure being different with the different type of vehicle engines.

The output of the amplifier circuit goes further to an integrater circuit consisting of a resistance 87 and a capacitance 88, where it is converted into a d.c. voltage with pulsating voltage removed therefrom. The d.c. voltage is then applied to an indicator circuit which is actuated to individually indicate the gap of the spark plug for each cylinder. The hold circuit 39 is reset by the action of a spark firing circuit which has a time constant depending on the resistance 81 and capacitance 80. The circuit 39 may be reset by actuating a switching circuit consisting of transistors or FET's, said switching circuit being actuated automatically or manually depending on the time required for measuring the gap of the spark plug.

Figure 9:
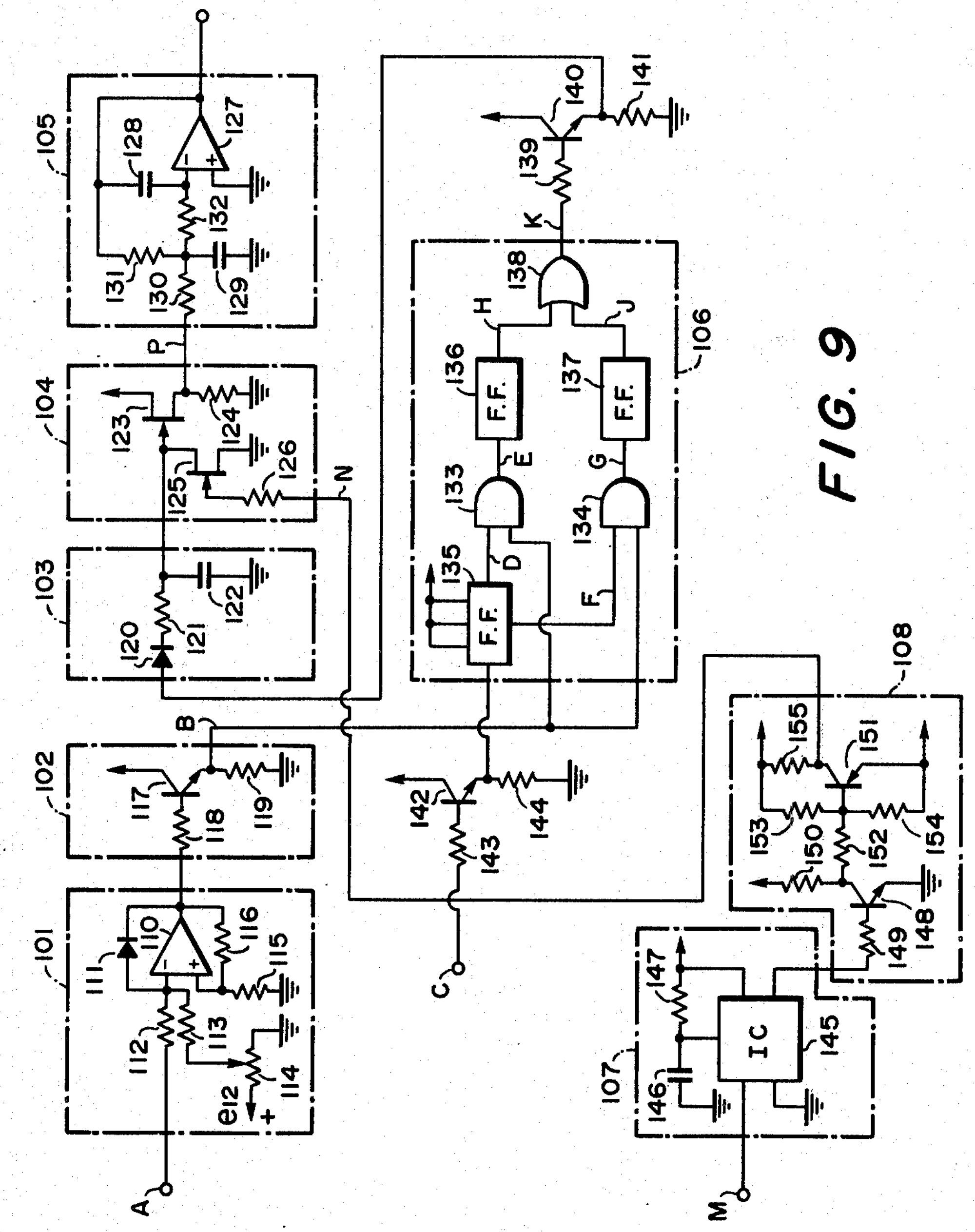
FIG. 9 is another circuit diagram showing circuit elements arranged for processing a low-voltage signal from the probe 20 according to the present invention.
Figure 10A:
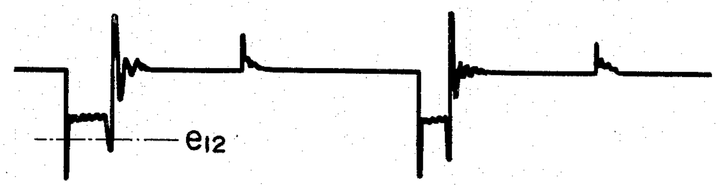
FIGS. 10A through 10P show waveforms of the pulses or signals provided by the circuit elements of FIG. 9.
Figure 10B:
Figure 10C:
Figure 10D:

FIG. 9 is another circuit diagram showing circuit elements arranged for processing a low-voltage signal from the probe 20 according to the present invention. In FIG. 10A through 10P, there are shown waveforms of the pulses or signals provided by the circuit elements.

The secondary-voltage signal or low-voltage signal (shown in FIG. 10A) from the probe 20 enters a circuit 101 for generating pulses of an interval where two pulses (shown in FIG. 10B) of an interval are generated, one occurring with the firing of the induced discharge portion and the other occurring at the end of the firing. The circuit 101 consists of a zero-cross Schmidt circuit which comprises an operational amplifier 110, diode 111 and resistances 112, 113, 114, 115 and 116. As shown in FIG. 10A, a Schmidt level voltage $e_{12}$ has a set value which is greater than the induced discharge portion. This enables the Schmidt circuit to generate pulses as the induced discharge portion is fired or by detecting a signal of the capacity discharge portion, and at the end of the firing of the induced discharge portion or by detecting the first frequency of a signal of the free-oscillating discharge portion.

The pulses of an interval are applied to AND-gates 133, 134 of a converter circuit 106 through a non-inverter circuit 102 consisting of a transistor 117 and resistances 118 and 119.

In the meantime, a point-make pulse (FIG. 10C) obtained from the primary-voltage signal of the ignition system is applied to a flip-flop 135 of the converter circuit 106 through a non-inverter circuit consisting of a transistor 142 and resistances 143 and 144. The outputs (FIG. 10D and FIG. 10F) of the flip-flop 135 lead to AND-gates 133, 134, respectively. The outputs of the AND-gates 133, 134 lead to bistable multi-circuits 136, 137, respectively, where they are converted into pulses.

Figure 10E:
Figure 10F:
Figure 10G:
Figure 10H:
Figure 10J:

The pulses which are obtained at an interval by the pulse generating circuit 101 each time the ignition takes place flow to AND gates 133, 134 which are then enabled to separate the pulses into individual pulses (shown in FIG. 10E and FIG. 10G). The individual pulses thus obtained are each converted into pulses (FIG. 10H and FIG. 10J) of a duration corresponding to the interval of the two pulses.

Figure 10K:

The outputs of the bistable multi-circuit 136, 137 lead to OR-gate circuit 138, the output (FIG. 10K) of said OR-gate circuit 138 leading to an integrating circuit 103 consisting of a diode 120, resistance 121 and capacitor 122 through a non-inverter circuit of a transistor 140 and resistances 139 and 141. The output (maximum value) of the integrating circuit 103 leads to a hold circuit 104 consisting of FET 123 and resistance 124 where it is held or stored. It will be understood, therefore, that a d.c. voltage signal of a duration proportional to the duration of the induced discharge portion or the length of the gap detected can be held in the hold circuit 104.

Figure 10M:
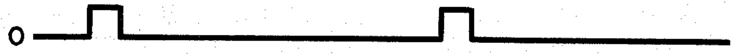
Figure 10N:
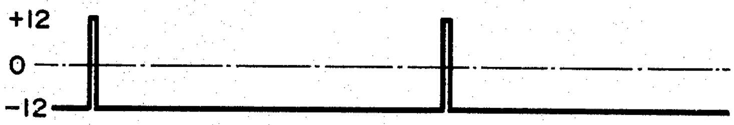
Figure 10P:
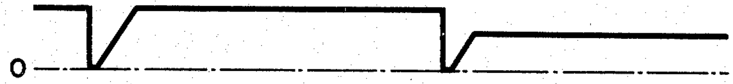

In the meantime, the detect signal (FIG. 10M) obtained from the primary-voltage signal is applied to a monostable circuit 107 consisting of IC 145, capacitor 146 and resistance 147 where a signal of a given duration is obtained. The output of the monostable 107 leads to a switching circuit 108 consisting of transistors 148 and 151, and resistances 148, 149, 150, 152, 153, 154 and 155 where it is converted into a reset signal (FIG. 10N) of positive and negative potential which is then applied through the resistance 126 to FET gate of the hold circuit 104. Upon receipt of the reset signal, the hold circuit 104 is actuated to reset the signal held therein. The output of the hold circuit 104 leads to the low-pass filter consisting of operational amplifier 127, capacitors 128 and 129, and resistances 130, 131 and 132 which is then actuated to remove the reset signal portion from the said output. The output of the low-pass filter or a d.c. voltage signal of a value proportional to the length of the gap detected leads to an indicating circuit (not shown).

Having thus described the invention, it will be apparent that changes may be made within the scope and spirit of the invention in accordance with the definition of the invention as claimed.

What is claimed:

1. An apparatus for measuring a gap between the electrodes of a spark plug for internal combustion engines, said apparatus comprising probe means adapted to detect a secondary voltage from an ignition system, comprising a potential divider of resistor means, for supplying of a low-voltage signal, and first circuit means comprising comparing means, connected to said probe means, for comparing a series of said low-voltage signal from said probe means with a reference voltage having a predetermined voltage value, and detecting means, connected to said comparing means, for detecting a time duration of said low-voltage signal when said low-voltage signal is larger than said reference voltage in the absolute value as a duration of an induced discharge portion included in said secondary voltage, and second circuit means comprising indicating means, connected to said detecting means, for indicating said time duration in readable forms, said first circuit means generating a pulse signal of rectangular waveform having a pulse width correspond to the length of the spark time of said induced discharge portion, and said second circuit means connected to said first circuit means convert said pulse signal to a voltage signal in response to said pulse width thereof and simultaneously display said time duration as said voltage signal with each ignition signal of each cylinder of said internal combustion engine.

2. An apparatus for measuring a gap between the electrodes of a spark plug for internal combustion engines, said apparatus comprising probe means adapted to detect a secondary voltage from an ignition system, comprising a potential divider of resistor means, for supplying of a low-voltage signal, and first circuit means comprising comparing means, connected to said probe means, for comparing a series of said low-voltage signal from said probe means with a reference voltage having a predetermined voltage value, and detecting means, connected to said comparing means, for detecting a time duration of said low-voltage signal when said low-voltage signal is larger than said reference voltage in the absolute value as a duration of an induced discharge portion included in said secondary voltage, and second circuit means comprising indicating means, connected to said detecting means, for indicating said time duration in readable forms, said first circuit means generating two pulses of an interval of the spark time of said induced discharge portion, one occurring with the firing of the induced discharge portion and the other occurring at the end of the firing, said second circuit means connected to said first circuit means signal-process said two pulses in order to obtain a pulse signal of the rectangular waveform having a pulse width corresponding to a time duration between said two pulses, convert said pulse signal to a voltage signal in response to said pulse width thereof, and simultaneously displaying said time duration as said voltage signal with each ignition signal of each cylinder of said internal combustion engine.

3. The apparatus according to claim 2 wherein said probe means includes a body of electrically insulating material and having a holder portion integrally therewith, a conductor member fixedly disposed within said body and having one end thereof detachably connectable with a secondary terminal of an ignition coil and the other end thereof detachably connectable with an ignition coil wire, and a potential divider fixedly disposed within the body and including a plurality of resistance elements connected with each other and having one end thereof connected to said conductor member and an output terminal at the other end thereof.

4. The apparatus according to claim 3 wherein said first circuit means comprise a pulse generator circuit comprising a zero-cross Schmidt circuit having a Schmidt level voltage e12, comprising an operational amplifier, diode and five resistors; and a first non-inverter circuit connected to an output of said amplifier, comprising a transistor and two resistors, said second circuit means comprise a converter circuit connected to said first non-inverter circuit, comprising a flip-flop, two AND-gates, two bistable multi-circuits and an OR-gate;

a second non-inverter circuit connected to said primary terminal of the ignition system and connected to said converter circuit, comprising a transistor and two a third non-inverter circuit connected to said primary terminal of the ignition system and connected to said OR-gate of the converter circuit, comprising a transistor and two resistors;

an integrating circuit connected to an output of said OR-gate of the converter circuit through said third non-inverter circuit, comprising a diode, resistor and capacitor;

a hold circuit connected to said integrating circuit, comprising first and second gates of FET and two resistors, said first gate of FET being connected to an output of said integrating circuit;

a monostable circuit connected to said primary terminal of the ignition system, comprising an IC, capacitor and resistor;

a switching circuit connected to an output of said monostable circuit, comprising two transistors and seven resistors, said switching circuit being connected to said second gate of FET of the hold circuit;

a low-pass filter connected to an output of said hold circuit, comprising an operational amplifier, two capacitors and three resistors;

an indicator circuit connected to an output of said amplifier of the low-pass filter.

5. An apparatus for measuring a gap between the electrodes of a spark plug for internal combustion engines, said apparatus comprising probe means adapted to detect a secondary voltage from an ignition system, comprising a potential divider of resistor means, for supplying of a low-voltage signal, and first circuit means comprising comparing means, connected to said probe means, for comparing a series of said low-voltage signal from said probe means with a reference voltage having a predetermined voltage value, and detecting means, connected to said comparing means, for detecting a time duration of said low-voltage signal when said low-voltage signal is larger than said reference voltage in the absolute value as a duration of an induced discharge portion included in said secondary voltage, and second circuit means comprising indicating means, connected to said detecting means, for indicating said time duration in readable forms, said first circuit means generating a pulse signal of rectangular waveform having a pulse width corresponding to the length of the spark time of said induced discharge portion, and said second circuit means connected to said first circuit means converting said pulse signal to a voltage signal in response to said pulse width thereof and simultaneously displaying said time duration as said voltage signal with each ignition signal of each cylinder of said internal combustion engine, said probe means including a body of electrically insulating material and having a holder portion integrally therewith, a conductor member fixedly disposed within said body and having one end thereof detachably connectable with a secondary terminal of an ignition coil and the other end thereof detachably connectable with an ignition coil wire, and a potential divider fixedly disposed within said body and including a plurality of resistance elements connected with each other and having one end thereof connected to said conductor member and an output terminal at the other end thereof.

6. The apparatus according to claim 5 wherein said first circuit means comprise a Butterworth-type low-pass filter; and a first zero-cross Schmidt circuit having a Schmidt level voltage *+el*, connected to said low-pass filter, comprising a differential-type operational amplifier, four resistors and a diode;

said second circuit means comprise a first integrator means connected to said Schmidt circuit of said first circuit means, comprising an amplifier, three resistors and two capacitors;

a separate circuit connected to said integrator means, comprising four gate elements of four FET and a selector switching means;

a trigger coil disposed adjacent to any one of cables interconnected to a distributor and spark plugs, for detecting a synchronizing signal from the secondary voltage signal;

a low-pass filter connected to said trigger coil, for filtering said synchronizing signal into a low-frequency signal;

a second Schmidt circuit connected to said low-pass filter, for shaping said low-frequency signal into a pulse signal of a rectangular waveform, comprising an amplifier, four resistors and a diode;

an AND-element circuit connected to outputs of said first and second Schmidt circuits;

a synchronizing circuit connected to said output of the first Schmidt circuit and said AND-element circuit, comprising a register, four switching circuits, two inverter gates and three AND-gates, said four switching circuits being respectively connected to said four gate elements of four FET of said separator circuit;

a hold circuit connected to any one of said gate elements through said selector switching means, comprising a diode, capacitor, two resistors and a FET;

an amplifier circuit connected to said hold circuit, comprising an amplifier, resistors and variable resistor;

a second integrator circuit connected to said amplifier circuit, comprising a resistor and a capacitor; and an indicator circuit connected to said integrator circuit.

7. The apparatus according to claim 1 wherein said first circuit means include a filter circuit for selecting said induced discharge portion from said low-voltage signal, and said second circuit means include a converter circuit for converting said duration into a voltage level and an indicating circuit for indicating an output of said converter circuit.

8. The apparatus according to claim 7 wherein said filter circuit comprises a Butterworth-type low-pass filter.

9. The apparatus according to claim 7 wherein said converter circuit comprises an integrating circuit.

10. The apparatus according to claim 7 wherein said filter circuit includes a waveform shaping circuit connected to an output of said filter circuit for shaping said output of said filter circuit into a pulse of a rectangular waveform.

11. The apparatus according to claim 10 wherein said waveform shaping circuit comprises a Schmidt circuit.

12. An apparatus for measuring a gap between the electrodes of a spark plug for internal combustion engines, said apparatus comprising probe means adapted to detect a secondary voltage from an ignition system, comprising a potential divider of resistor means, for supplying of a low-voltage signal, and first circuit means comprising means, connected to said probe means, for comparing a series of said low-voltage signal from said probe means with a reference voltage having a predetermined voltage value, and detecting means, connected to said comparing means, for detecting a time duration of said low-voltage signal when said low-voltage signal is larger than said reference voltage in the absolute value as a duration of an induced discharge portion included in said secondary voltage, and second circuit means comprising indicating means, connected to said detecting means, for indicating said time duration in readable forms, said second circuit means including a separating circuit actuated to separate a series of signals representing a gap in each of the cylinders into an individual signal for each of said cylinders, said separating circuit including a plurality of gate elements each provided in each of said cylinders, said separating circuit including a trigger coil adapted to detect presence of said secondary voltage when said secondary voltage is applied to any one of said cylinders, and a synchronizing circuit actuated upon receipt of a signal from said trigger coil and said secondary-voltage signal to feed a series of synchronizing signals to each of said gate elements of said separating circuit, and said synchronizing circuit including register means to be reset upon receipt of said signal from said trigger coil and said secondary-voltage signal, and a logic circuit operative to feed a series of outputs of said register means to each of said gate elements of said separating circuit.

13. The apparatus according to claim 12 wherein said trigger coil includes an induction coil.

* * * * *